(12) United States Patent
Nennstiel et al.

(10) Patent No.: US 12,345,321 B2
(45) Date of Patent: Jul. 1, 2025

(54) DRIVE TRAIN

(71) Applicant: Volkswagen Aktiengesellschaft, Wolfsburg (DE)

(72) Inventors: Lukas Nennstiel, Kassel (DE); Thomas Schroeder, Berlin (DE); Frank Mueller, Essenrode (DE); Raimar Warnecke, Gross Schwuelper (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/646,730

(22) Filed: Apr. 25, 2024

(65) Prior Publication Data
US 2024/0360899 A1    Oct. 31, 2024

(30) Foreign Application Priority Data

Apr. 26, 2023   (DE) ...................... 10 2023 203 886.2

(51) Int. Cl.
*F16H 57/04*   (2010.01)

(52) U.S. Cl.
CPC ....... *F16H 57/045* (2013.01); *F16H 57/0412* (2013.01); *F16H 57/0423* (2013.01); *F16H 57/0424* (2013.01); *F16H 57/0476* (2013.01); *F16H 57/0457* (2013.01)

(58) Field of Classification Search
CPC ............. F16H 57/0412; F16H 57/0423; F16H 57/0424; F16H 57/045; F16H 57/0457; F16H 57/0476; H05K 7/20272
See application file for complete search history.

(56) References Cited

U.S. PATENT DOCUMENTS

| | | | |
|---|---|---|---|
| 5,072,784 A | 12/1991 | Stenlund | |
| 7,800,260 B2 | 9/2010 | Komatsu et al. | |
| 10,746,282 B2 * | 8/2020 | Ito | F16H 57/0471 |
| 11,434,977 B2 * | 9/2022 | Takahashi | F16H 57/04 |

(Continued)

FOREIGN PATENT DOCUMENTS

| | | | | |
|---|---|---|---|---|
| CN | 109253222 A * | 1/2019 | | F16H 37/02 |
| DE | 3874730 T2 | 2/1993 | | |

(Continued)

*Primary Examiner* — Adam D Rogers
(74) *Attorney, Agent, or Firm* — Muncy, Geissler, Olds & Lowe, P.C.

(57) ABSTRACT

A drive train for an electric vehicle, including at least one transmission, with at least one power electronics system and a housing. A transmission compartment and a power electronics system compartment are provided in the housing in particular adjacently situated horizontally. The transmission and/or at least two gearwheels for forming at least one gear stage of the transmission is situated in the transmission compartment and the power electronics system is situated in the power electronics system compartment. The transmission compartment and the power electronics system compartment are separated from one another by a partition wall. The transmission includes an oil sump, which in particular is formed by the housing, and a collection container, so that during operation of the transmission, transmission oil present in the oil sump may be spun upwardly by at least one of the gearwheels and thus be supplied to the collection container.

10 Claims, 4 Drawing Sheets

(56) References Cited

U.S. PATENT DOCUMENTS

| | | | | |
|---|---|---|---|---|
| 11,608,883 | B2* | 3/2023 | Nakata | F16H 57/0424 |
| 11,777,364 | B2* | 10/2023 | Ishikawa | H02K 11/33 |
| | | | | 310/54 |
| 11,781,643 | B2* | 10/2023 | Fujimoto | F16H 57/0417 |
| | | | | 184/6.12 |
| 2013/0145879 | A1* | 6/2013 | Nakamura | F16H 57/0441 |
| | | | | 74/467 |
| 2022/0190685 | A1 | 6/2022 | Fernandez et al. | |
| 2022/0205529 | A1* | 6/2022 | Takada | F16H 57/0426 |
| 2023/0120835 | A1 | 4/2023 | Okamoto | |
| 2024/0429785 | A1* | 12/2024 | Mori | F16H 57/0456 |

FOREIGN PATENT DOCUMENTS

| | | |
|---|---|---|
| DE | 112006003015 T5 | 10/2008 |
| DE | 102018220496 A1 | 5/2020 |
| EP | 0990820 A2 * | 4/2000 |
| EP | 2161479 A1 | 3/2010 |
| WO | WO2020207537 A1 | 10/2020 |
| WO | WO2021109980 A1 | 6/2021 |
| WO | WO2022057207 A1 | 3/2022 |
| WO | WO2022268858 A1 | 12/2022 |

* cited by examiner

DRIVE TRAIN

This nonprovisional application claims priority under 35 U.S.C. § 119 (a) to German Patent Application No. 10 2023 203 886.2, which was filed in Germany on Apr. 26, 2023, and which is herein incorporated by reference.

BACKGROUND OF THE INVENTION

Field of the Invention

The invention relates to a drive train.

Description of the Background Art

Drive trains for electric vehicles having a transmission, a power electronics system, and a housing are known in the prior art. The energy that is suppliable to an electric machine of the electric vehicle or that is withdrawable from such an electric machine may be converted by use of the power electronics system, for example to allow coupling of the electric machine to a battery.

Such a drive train is known from WO 2020/207537 A1, which corresponds to US 2022/0190685, in the housing of which a power electronics system compartment, a transmission compartment, and an electric machine compartment are adjacently situated horizontally. The transmission and/or at least two gearwheels for forming at least one gear stage of the transmission are/is situated in the transmission compartment, and the power electronics system is situated in the power electronics system compartment. The transmission compartment and the power electronics system compartment are separated from one another by a partition wall. At an outer side of the housing in the area of the power electronics system compartment, a heat exchanger is provided in part with a housing cover for the power electronics system compartment. An oil circuit of the transmission including an oil pump, and a cooling circuit of the electric machine including a coolant pump, are connected to a respective side of this heat exchanger. Heat transfer between a transmission oil circulating in the oil circuit and a cooling fluid circulating in the cooling circuit is made possible by means of the heat exchanger.

This type of heat management of the transmission oil is difficult to implement from a design and control standpoint. At least the two stated pumps must be provided, and must be controlled and/or regulated. In addition, establishing the fluidic connections between these pumps and the heat exchanger requires a correspondingly high level of effort. Furthermore, energy must be provided for operating the two pumps, which adversely affects the efficiency of the drive train.

A transmission is known from EP 2 161 479 A1, in the housing of which cooling channels are provided. These cooling channels are connected to the cooling channels of an internal combustion engine. A meandering flow of the cooling fluid through the cooling channel is made possible by ribs that protrude into the cooling channel.

However, the cooling of the transmission oil present in the transmission does not have an optimal design here. In particular, it is difficult to control the portion of the transmission oil that is present, as well as the time during which it is present, adjoining the cooling channels, so that the change in temperature of the transmission oil is not precisely known or predeterminable. This makes the control and/or regulation of the transmission, in particular its cooling, more difficult or problematic.

Lastly, DE 10 2018 220 496 A1 discloses a further drive train with an electric machine, including a transmission, a power electronics system, and a shared housing. The power electronics system is situated at the top side of the shared housing. An oil sump in which transmission oil collects during operation is situated in the transmission. The transmission oil is suppliable from the oil sump, via an oil pump, to the components of the electric machine and/or of the transmission to be cooled and/or lubricated. Cooling channels are provided in the housing, adjacent to the oil sump. The housing has ribs that are situated in the oil sump and that contact the transmission oil, so that the ribs improve the heat transfer from cooling fluid, present in the cooling channels, to the transmission oil.

However, there is essentially little or no movement of the transmission oil in the oil sump, resulting in reduced heat transfer to the transmission oil, since this heat transfer to the transmission oil takes place essentially solely via heat conduction with a correspondingly low heat transfer coefficient.

Transmissions having a collection container are also known, during operation of which the transmission oil present in the oil sump may be spun upwardly by means of at least one of the gearwheels of the transmission and may thus be supplied to the collection container. From the collection container, the transmission oil is then suppliable to the components of the electric machine and/or of the transmission to be cooled and/or lubricated.

SUMMARY OF THE INVENTION

It is therefore an object of the invention to design and/or refine the drive train in such a way that the problems stated at the outset are avoided but at least reduced, in particular the transmission oil then being more easily and effectively coolable.

In an aspect of the invention, it is essentially provided that a partition wall has at least one cooling channel, the collection container being spaced apart, at least in part, from the partition wall, a transmission oil cooling area being formed between the collection container and the partition wall, the collection container having an overflow, the transmission oil being suppliable to the transmission oil cooling area via the overflow, in particular guidable through the transmission oil cooling area with the aid of the force of gravity, and being coolable by the cooling fluid that is present in the cooling channel.

Thus, an oil pump is not necessary to cool the transmission oil itself, and also is not necessary to cool and/or lubricate the components of the transmission by means of the transmission oil. The cooling of the transmission oil itself, and the cooling and/or lubrication of the components of the transmission, are thus particularly easy and achievable with little technical complexity of the device and little control and/or regulation effort. In addition, use is also advantageously made of an appreciable portion of the force of gravity for conveying the transmission oil, so that overall, energy may be saved during operation of the drive train. During the cooling of the transmission oil, convective heat transfer between the partition wall and the transmission oil is achieved with a correspondingly high heat transfer coefficient.

The collection container can have at least one container rib on the side facing the partition wall. The heat transfer between the transmission oil and the cooling fluid in the transmission oil cooling area may be improved by use of this container rib, since the transmission oil may be supplied to the partition wall by means of the container rib.

The partition wall can have at least one partition wall rib on the side facing the collection container. In addition, the heat transfer between the transmission oil and the cooling fluid in the transmission oil cooling area may be improved by use of the partition wall rib, since the transmission oil in particular may be circulated by means of the partition wall rib, so that when the transmission oil flows through the transmission oil cooling area, other "still warm" regions of the transmission oil repeatedly come into contact with the partition wall, where they are cooled in order to once again conduct further "warmer" regions of the transmission oil to the partition wall. The convective heat transfer between the partition wall and the transmission oil is thus improved, and the associated heat transfer coefficient is increased. In addition, by means of the partition wall rib the surface area for the heat transfer between the partition wall and the transmission oil is increased, and the heat transfer here is thus further improved.

The collection container can have at least two container ribs and the partition wall preferably has at least two partition wall ribs. The container ribs and the partition wall ribs are arranged in alternation, in particular so that meandering flow channels of the transmission oil cooling area are formed with the aid of the container ribs and the partition wall ribs. In this way, the above-mentioned effects of supplying the transmission oil toward the partition wall and circulating the transmission oil are particularly well combined, and in particular are easily controllable or predeterminable when designing the transmission oil cooling area. Due to the alternatingly arranged container ribs and partition wall ribs, in particular the meandering flow channels, the flow path of the transmission oil through the transmission oil cooling area is advantageously extended.

The container ribs and the partition wall ribs can be oriented essentially horizontally. By use of the container ribs, the transmission oil is thus particularly well conductible to the partition wall with the aid of the force of gravity. The transmission oil flows, for example, vertically downwardly from the overflow, and then meets the container rib and is deflected by essentially 90° by the container rib due to the essentially horizontal arrangement, so that a majority of the transmission oil subsequently flows in the direction of the partition wall. Due to the essentially horizontally oriented partition wall ribs, the circulation of the transmission oil is further improved, in particular in combination with the essentially horizontally oriented container ribs. In this context, "essentially horizontal" means that even a slight inclination of the container ribs and of the partition wall ribs of preferably up to 5° to 10° degrees is conceivable, as long as it is ensured that the majority of the transmission oil is deflected in the direction of the partition wall by means of the container ribs, and that a sufficiently high circulation rate of the transmission oil is achieved. When the drive train itself is installed in a vehicle, such a vehicle could also be obliquely oriented, for example when traveling up or down a slope. The horizontal orientation of the container ribs and of the partition wall ribs is then achieved in particular for a horizontal orientation of the vehicle.

The container ribs and the partition wall ribs can be situated and/or provided below the overflow, in particular below an overflow edge of the overflow. During operation of the drive train, the transmission oil then flows from the collection container to the container ribs and to the partition wall ribs. Since the transmission oil flows through the transmission oil cooling area essentially due to the force of gravity, container ribs and/or partition wall ribs situated above the overflow would be less practical in terms of the cooling of the transmission oil, since during operation of the drive train the transmission oil contacts the partition wall essentially below the overflow.

The transmission oil can be suppliable from the transmission oil cooling area to the oil sump, in particular with the aid of the force of gravity. A transmission oil circuit is completed in this way. The transmission oil is then spun upwardly from the oil sump during operation of the drive train and collected by the collection container, from which the transmission oil flows through the overflow and into the transmission oil cooling area, so that after passing through, it flows back into the oil sump.

The power electronics system can be situated, at least in part, at the partition wall, in particular to form a heat-conducting connection. The power electronics system may thus be cooled particularly well by means of the cooling fluid that is present in the cooling channel.

The power electronics system can be situated in the power electronics system compartment, adjoining, at least in part, the cooling channel, in particular situated, at least in part, at the same height as the cooling channel. The overflow is situated in the transmission compartment, adjoining or opposite from, at least in part, the cooling channel, in particular situated, at least in part, at the same height as the cooling channel, so that the transmission oil is directly suppliable via the overflow to a subarea of the transmission oil cooling area adjoining the cooling channel.

Due to the arrangement of the power electronics system adjoining, in particular at least in part, the cooling channel, in particular being situated, at least in part, at the same height as the cooling channel, the heat transfer between the cooling fluid present in the cooling channel and the power electronics system is further improved just by minimizing the material, in particular the partition wall, situated between the cooling fluid and the power electronics system. In other words, particularly high heat transfer coefficients between the cooling fluid and the power electronics system are achievable in this way.

Due to the arrangement of the overflow adjoining or opposite from, at least in part, the cooling channel, in particular being situated, at least in part, at the same height as the cooling channel, the heat transfer between the cooling fluid present in the cooling channel and the transmission oil is also further improved. The transmission oil, which is then particularly warm upon reaching the transmission oil cooling area, then comes directly into contact with the particularly cold region of the partition wall due to the cooling channels adjoining here. The high temperature gradient which thus forms between the transmission oil and the partition wall also results in particularly high heat transfer.

The partition wall can have multiple, preferably straight-running, cooling channels. In particular, the cooling channels are formed via a borehole introduced in each case into the housing. In particular, the cooling channels have a certain angle with respect to the container ribs and to the partition wall ribs.

These types of cooling channels can be particularly easy and economical to manufacture. Due to the formation of the angle, the cooling channels, despite the simple design of the cooling channels, may be formed in a large region of the partition wall adjoining the transmission oil cooling area, in particular adjoining or opposite from, at least in part, the overflow and also adjoining, at least in part, the container ribs and the partition wall ribs or the meandering flow channels of the transmission oil cooling area. Overall, particularly effective temperature control of the transmission oil is thus achieved.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
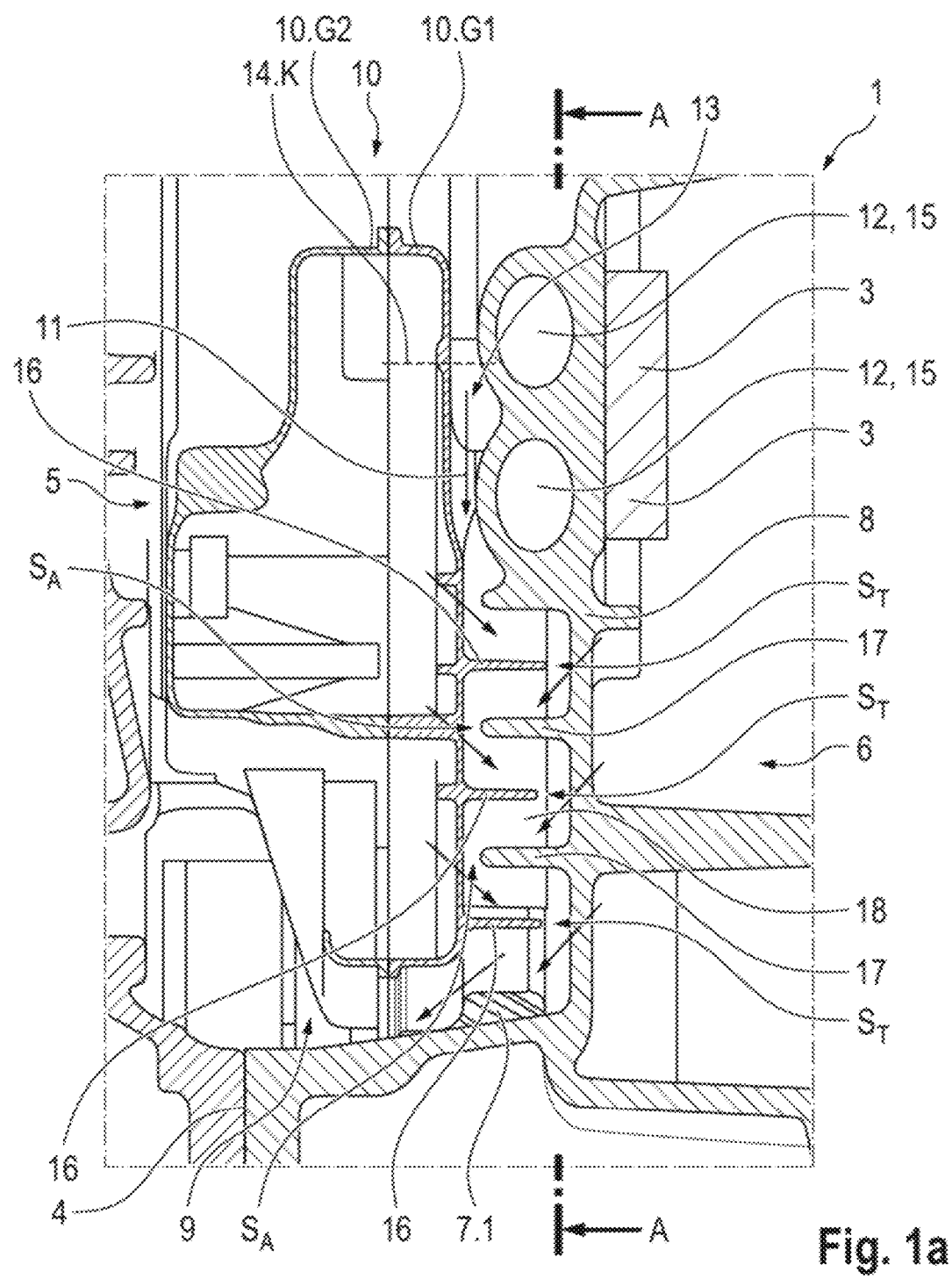
FIG. 1a shows a schematic illustration of an example of the drive train in a first, lateral sectional view.

FIGS. 1a through 2b show a drive train 1, in particular for an electric vehicle, including at least one transmission 2 with at least one power electronics system 3 and a housing 4.

A transmission compartment 5 and a power electronics system compartment 6 are provided in the housing 4, in particular adjacently situated horizontally.

The transmission 2 and/or at least two gearwheels 7.1, 7.2 for forming at least one gear stage 7 of the transmission 2 are/is situated in the transmission compartment 5, and the power electronics system 3 is situated in the power electronics system compartment 6.

The transmission compartment 5 and the power electronics system compartment 6 are separated from one another by a partition wall 8.

The transmission 2 has an oil sump 9, in particular formed by means of the housing 4, and a collection container 10, so that during operation of the transmission 2, transmission oil 11 present in the oil sump 9 may be spun upwardly by means of at least one of the gearwheels 7.1, 7.2 and may thus be supplied to the collection container 10. The transmission oil 11 itself is symbolized by flow arrows that show the flow direction of the transmission oil 11 during operation of the drive train 1.

A cavity for accommodating the transmission oil 11 is formed in the collection container 10. The collection container 10 has a collection opening via which the transmission oil 11 is suppliable, with the aid of one of the gearwheels 7.1, 7.2, from the oil sump 9 to the collection container 10 via the upward spinning.

The partition wall 8 has at least one cooling channel 12. The collection container 10 is spaced apart, at least in part, from the partition wall 8. A transmission oil cooling area 13 is formed between the collection container 10 and the partition wall 8. The collection container 10 has an overflow 14. The transmission oil 11 is suppliable to the transmission oil cooling area 13 via the overflow 14, in particular guidable through the transmission oil cooling area 13 with the aid of the force of gravity, and is coolable by means of the cooling fluid 15 present in the cooling channel 12.

The overflow 14 is designed as an opening in a housing wall of the collection container 10. It is also conceivable for multiple openings to be provided, which then form or provide the overflow. The collection container 10 has essentially two collection container housing parts 10.G1, 10.G2 that are connected to one another. The collection container 10, in particular a collection container housing part 10.G1 facing the partition wall 8, is preferably connected to the partition wall 8, in particular by means of a screw connection or clamp connection. The overflow 14 is designed in particular as an opening in the housing wall in this collection container housing part 10.G1 facing the partition wall 8. The overflow 14 in particular has a kidney-shaped design. During operation of the drive train 1, the transmission oil 11 collects in the collection container 10, rises up to the overflow 14, and upon further supplying of transmission oil 11 then flows to the transmission oil cooling area 13 via the overflow 14.

The collection container 10 has at least one container rib 16 on the side facing the partition wall 8. The container rib 16 is preferably situated and/or provided at the collection container housing part 10.G1 facing the partition wall 8. A gap ST is formed in particular across the complete length of the container rib 16, between the end-face side of the container rib 16 facing the partition wall 8 and the partition wall 8. However, it would also be conceivable for the container rib 16 to contact the partition wall 8, at least in part.

The partition wall 8 has at least one partition wall rib 17 on the side facing the collection container 10. A gap SA is likewise formed in particular across the complete length of the partition wall rib 17, between the end-face side of the partition wall rib 17 facing the collection container 10 and the collection container 10. However, it would also be conceivable for the partition wall rib 17 to contact the collection container 10, at least in part. The partition wall rib 17 preferably merges into a wall of the housing 4 that is formed in particular adjoining the partition wall 8, or contacts this wall adjoining the partition wall 8.

The collection container 10 has at least two container ribs 16 and the partition wall 8 has at least two partition wall ribs 17. The container ribs 16 and the partition wall ribs 17 are arranged in alternation, in particular so that meandering flow channels 18 of the transmission oil cooling area 13 are formed with the aid of the container ribs 16 and the partition wall ribs 17.

The flow channels 18 form between mutually facing sides of the container ribs 16 and of the partition wall ribs 17, and during operation of the drive train 1, flow passes from top to bottom through the flow channels in succession, starting from the overflow 14. The transmission oil 11 is guidable in particular with the aid of the top sides of the container ribs 16 and of the partition wall ribs 17. Depending on the height of the mass flow of the transmission oil 11 flowing through the transmission oil cooling area 13, an air-filled space forms between the transmission oil 11 and the bottom sides of the container ribs 16 and of the partition wall ribs 17, or the flow channels 18 are completely filled with transmission oil 11.

The container ribs 16 and the partition wall ribs 17 are oriented essentially horizontally. The transmission oil 11 is suppliable to the partition wall 8 with the aid of the horizontally oriented container ribs 16, and may be led back away from the partition wall 8 with the aid of the horizontally oriented partition wall ribs 17, as symbolized by the flow arrows in FIG. 1a. A gap SG is preferably formed in each case not only between the container ribs 16 and the partition wall 8, but also between the container ribs 16 and the housing 4, as is apparent in particular from FIGS. 2a and 2b, through which the transmission oil 11 may flow downwardly past the particular container rib 16.

The collection container 10 has a web region 10.S, formed essentially perpendicularly with respect to the container ribs 16, into which the container ribs 16 merge. This web region 10.S is oriented in particular along an outer contour of one of the gearwheels 7.1, so that as a result of this web region 10.S, in particular the transmission oil 11 is prevented from being directly "sucked out" of the flow channels 18 formed by the container ribs 16 and the partition wall ribs 17, in particular due to a rotation of the gearwheel 7.1. A gap $S_S$ is preferably formed in each case not only between the partition wall ribs 17 and the collection container 10, but also between the partition wall ribs 17 and the web region 10.S, as is apparent in particular from FIGS. 2a and 2b, through which the transmission oil 11 may flow downwardly past the particular partition wall rib 17, and in particular may then correspondingly flow further to the oil sump 9.

The container ribs 16 and the partition wall ribs 17 are situated and/or provided below the overflow 14, in particular below an overflow edge 14.K of the overflow 14. A space is formed in the vertical direction, between the overflow edge 14.K and the first of the container ribs 16, so that during operation of the drive train 1 the transmission oil 11, after leaving the collection container 10, initially flows downwardly and vertically between the collection container 10 and the partition wall 8.

The transmission oil 11 is suppliable from the transmission oil cooling area 13 to the oil sump 9, in particular with the aid of the force of gravity. A corresponding open space is provided for this purpose, between the collection container 10, in particular also between a last of the container ribs 16, and the housing 4.

Figure 1B:
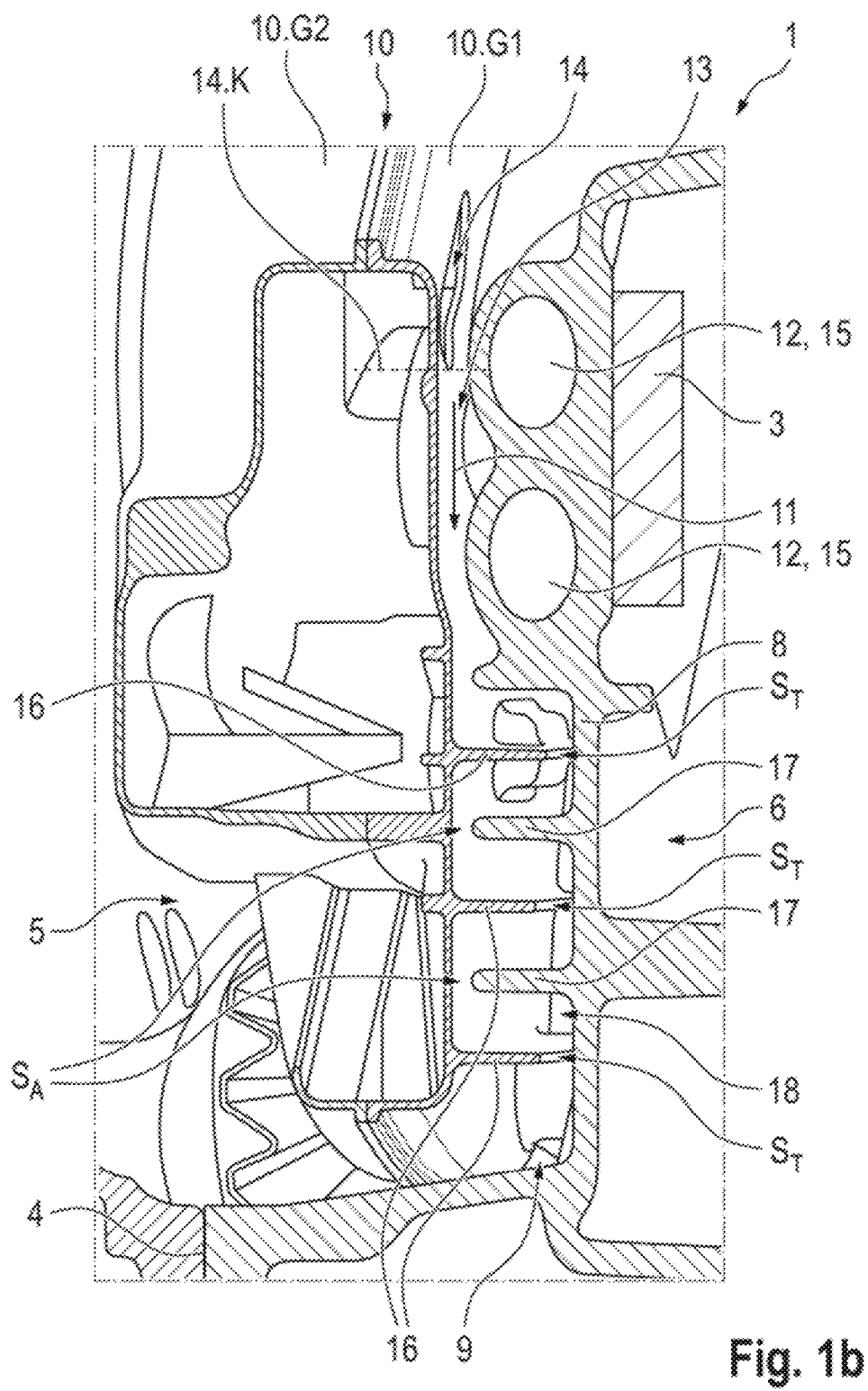
FIG. 1b shows a schematic illustration of the drive train in a slightly rotated view with respect to the first, lateral sectional view from FIG. 1a, and thus in a three-dimensional or perspective view.
Figure 2A:
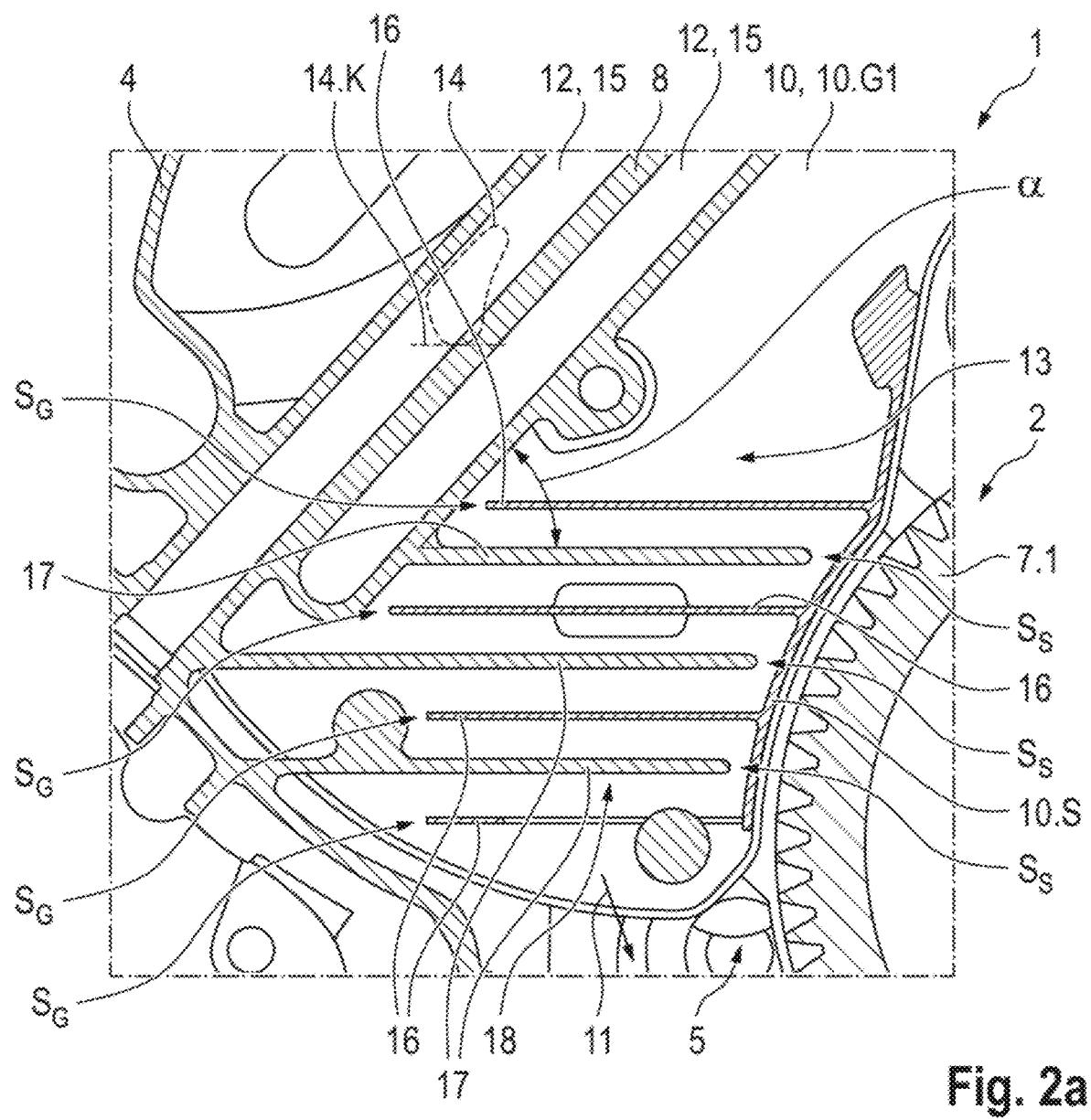
FIG. 2a shows a schematic illustration of the drive train in a sectional view along line A-A from FIG. 1a, and thus in a second, lateral sectional view.
Figure 2B:
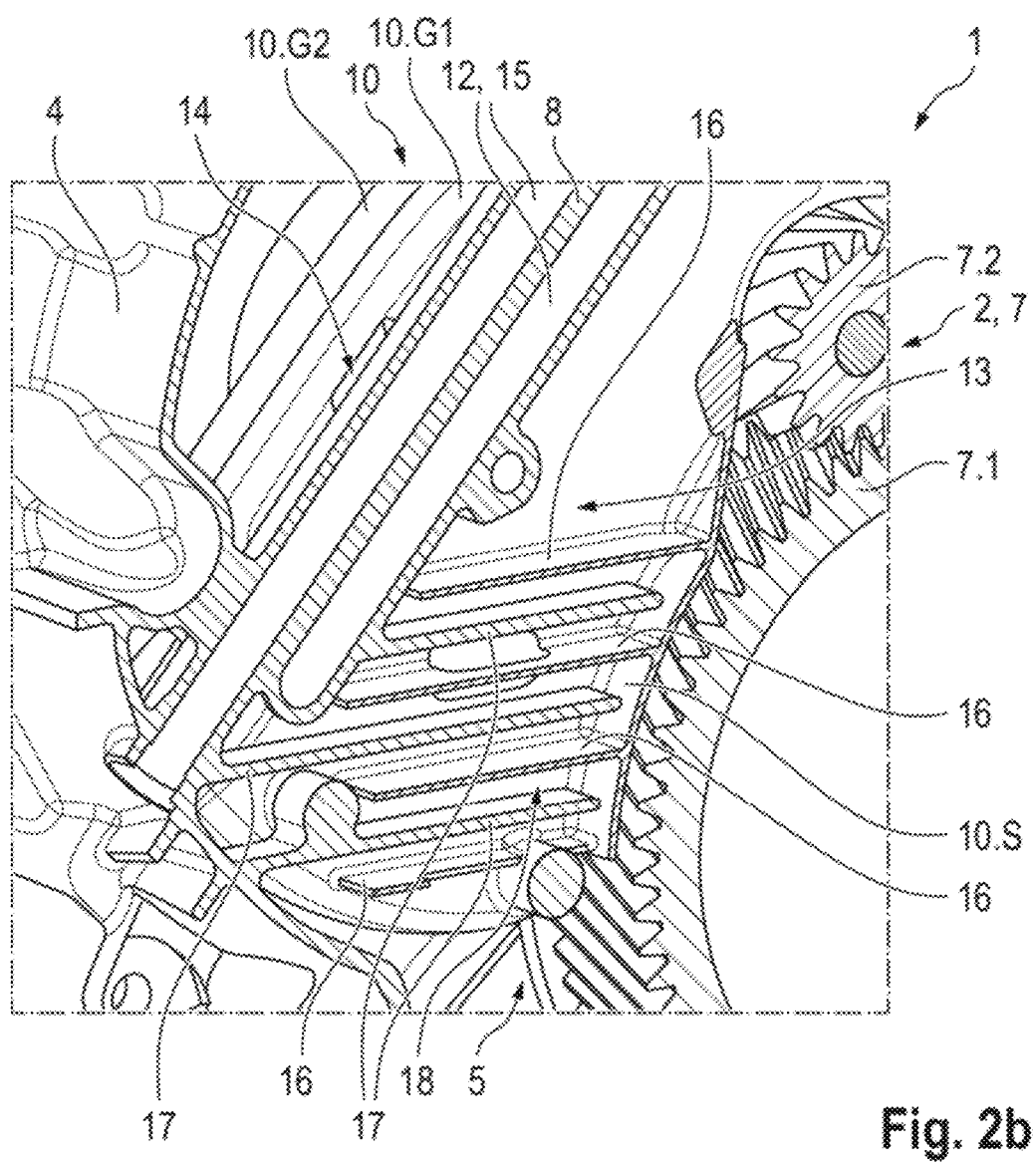
FIG. 2b shows a schematic illustration of the drive train in a slightly rotated view with respect to the second, lateral sectional view from FIG. 2a, and thus in a three-dimensional or perspective view.

The power electronics system 3 rests, at least in part, against the partition wall 8, in particular to form a heat-conducting connection, as shown in particular in FIGS. 1a and 1b. The power electronics system 3 is situated, at least in part, adjoining the cooling channel 12 in the power electronics system compartment 6. The overflow 14 is situated, at least in part, adjoining the cooling channel 12 in the transmission compartment 5, so that the transmission oil 11 is directly suppliable via the overflow 14 to a subarea of the transmission oil cooling area 13 that is provided adjoining the cooling channel 12. During operation of the drive train 1, after leaving the collection container 10 the transmission oil 11 thus initially contacts the region of the partition wall 8 in which the cooling channel 12 is formed, so that the transmission oil 11 and the cooling fluid 15 are then separated from one another only by a thin web of the partition wall 8, thus enabling high heat transfer. This position of the overflow 14 is also apparent in particular from the illustration of the overflow 14 from FIG. 2a; on account of the perspective, the overflow 14 here is situated behind the cooling channels 12 and therefore is illustrated with dashed lines.

The partition wall 8 has multiple, preferably straight-running, cooling channels 12. In particular, the cooling channels 12 are formed via a borehole introduced in each case into the housing 4. In particular, the cooling channels 12 have a certain angle $\alpha$ with respect to the container ribs 16 and to the partition wall ribs 17. In particular, two cooling channels 12 are provided, the cooling fluid 15 being suppliable to one of the two cooling channels 12 by means of a cooling fluid pump, for example, and the cooling fluid 15 being dischargeable from the other of the two cooling channels 12, in particular by means of the same cooling fluid pump, to form a cooling fluid flow circuit.

In the example, the drive train 1 is designed in particular for an electric vehicle. An electric machine is therefore provided and/or is present, in particular the electric machine and/or the transmission 2 being appropriately controllable and/or activatable by means of the power electronics system 3.

FIGS. 1 and 2 in particular do not explicitly illustrate the above-mentioned electric machine. However, in the example of the drive train, not only the transmission 2 but also the electric machine is cooled, at least in part, via the above-described oil circuit, in particular via the above-described transmission oil cooling circuit, in particular together with same. In other words, the transmission 2 and the corresponding electric machine are then cooled via a transmission oil circuit that is jointly designed, at least in part. The transmission oil that collects in the oil sump 9 is then also correspondingly used for cooling the electric machine. The term "transmission oil" used here is therefore not to be construed as limiting, but, rather, in general also encompasses the term "coolant and/or lubricant" for cooling the electric machine, with the aid of which the transmission 2 and the electric machine may be cooled. In particular, the transmission oil for cooling the electric machine, which is then supplied to the electric machine, is also withdrawn from the collection container 10 and supplied to the electric machine, in particular to a rotor shaft of the electric machine. For this purpose, the collection container 10 in particular may have a further overflow for guiding the transmission oil to the rotor shaft of the electric machine. The transmission oil that cools the electric machine, after cooling the electric machine, is then led to the oil sump 9 or led back, to which explicit reference is once again made.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A drive train for an electric vehicle, the drive train comprising:
   at least one transmission;
   at least one power electronics system;
   a housing;
   a partition wall; and
   a transmission compartment and a power electronics system compartment being provided in the housing and adjacently arranged horizontally,
   wherein the transmission and/or at least two gearwheels for forming at least one gear stage of the transmission are arranged in the transmission compartment, and
   wherein the power electronics system is arranged in the power electronics system compartment,
   wherein the transmission compartment and the power electronics system compartment are separated from one another by the partition wall,
   wherein the transmission includes an oil sump, which is formed via the housing, and a collection container so that during operation of the transmission, transmission oil present in the oil sump is spun upwardly via at least one of the gearwheels and thus supplied to the collection container, wherein the partition wall has at least one cooling channel, the collection container being spaced apart, at least in part, from the partition wall, and wherein a transmission oil cooling area is formed between the collection container and the partition wall, the collection container having an overflow, the transmission oil being suppliable to the transmission oil cooling area via the overflow or guidable through the transmission oil cooling area with the aid of the force of gravity, and being coolable by a cooling fluid that is present in the cooling channel.

2. The drive train according to claim 1, wherein the collection container has at least one container rib on a side facing the partition wall.

3. The drive train according to claim 1, wherein the partition wall has at least one partition wall rib on a side facing the collection container.

4. The drive train according to claim 1, wherein the collection container has at least two container ribs and the partition wall has at least two partition wall ribs, the container ribs and the partition wall ribs being arranged in alternation so that flow channels of the transmission oil cooling area are formed with the aid of the container ribs and the partition wall ribs.

5. The drive train according to claim 4, wherein the at least two container ribs and the at least two partition wall ribs are oriented essentially horizontally.

6. The drive train according to claim 4, wherein the at least two container ribs and the at least two partition wall ribs are situated and/or provided below the overflow below an overflow edge of the overflow.

7. The drive train according to claim 4, wherein the at least one cooling channel of the partition wall has multiple straight-running cooling channels, or wherein the cooling channels are formed via a borehole introduced in each case into the housing, or wherein the cooling channels are formed having an angle with respect to the at least two container ribs and to the at least two partition wall ribs.

8. The drive train according to claim 1, wherein the transmission oil is suppliable from the transmission oil cooling area to the oil sump with the aid of the force of gravity.

9. The drive train according to claim 1, wherein the power electronics system rests, at least in part, against the partition wall to form a heat-conducting connection.

10. The drive train according to claim 1, wherein the power electronics system is situated in the power electronics system compartment adjoining, at least in part, the cooling channel, and the overflow is situated in the transmission compartment, adjoining, at least in part, the cooling channel so that the transmission oil is directly suppliable via the overflow to a subarea of the transmission oil cooling area that is provided adjoining the cooling channel.

\* \* \* \* \*